United States Patent Office 2,806,862
Patented Sept. 17, 1957

2,806,862

PROCESS FOR PRODUCING 10-HYDROXY-4-ESTRENES

Raymond L. Pederson, Kalamazoo Township, Kalamazoo County, and John C. Babcock, Portage Township, Kalamazoo County, Mich., assignors to The Upjohn Company, Kalamazoo, Mich., a corporation of Michigan No Drawing. Application November 21, 1955,
Serial No. 548,259

4 Claims. (Cl. 260—397.4)

The present invention relates to a process for the production of steroid compounds and is more particularly concerned with a process for the production of 10,17-dihydroxy-4-estren-3-one and the oxygenated product thereof 10-hydroxy-4-estrene-3,17-dione.

The process and compound of the present invention may be represented by the following sequence of formulae:

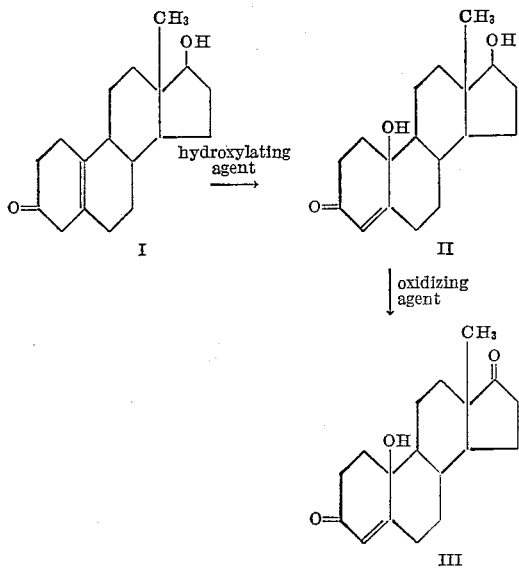

The process of the present invention comprises treating 17-hydroxy-5(10)-estren-3-one (I) [Birch, J. Chem. Soc. 367 (1950)] with a hydroxylating agent, such as osmium tetroxide, peracids, hydrogen peroxide, and the like, and decomposing the thus obtained olefin addition product by mild alkali reagent such as sodium bisulfite, sodium bicarbonate, potassium bicarbonate, potassium bisulfite, mixtures thereof, or the like, to obtain 10,17β-dihydroxy-4-estren-3-one (II). Oxidation of 10,17β-dihydroxy-4-estren-3-one (II), illustratively with chromic anhydride, produces 10 - hydroxy - 4 - estrene-3,17-dione (III).

It is an object of the present invention to provide a process for the production of 10,17β-dihydroxy-4-estren-3-one and a process for the production of 10-hydroxy-4-estren-3,17-dione. It is another object of the present invention to provide the novel compound, 10-hydroxy-4-estrene-3,17-dione. Other objects of the invention will be apparent to one skilled in the art to which this invention pertains.

The novel compounds, 10,17β-dihydroxy-4-estren-3-one and 10-hydroxy-4-estrene-3,17-dione, have gonadotropic inhibitory activity as well as essentially anabolic and estrogenic activity. Both compounds 10,17β-dihydroxy-4-estren-3-one and 10-hydroxy-4-estrene-3,17-dione are valuable intermediates in the production of estrogens; treating them with dilute acid produces estradiol or estrone respectively as shown in Examples 4 and 5.

In carrying out the process of the present invention, 17β-hydroxy-5(10)-estren-3-one, dissolved in an organic solvent such as benzene, cyclohexane, heptane, ether, methylene dichloride, chloroform, carbon tetrachloride, ethylene dichloride, tertiary butyl alcohol, pyridine, and other solvents, which are not attacked by the oxidant used, is reacted with a hydroxylating agent such as, for example, osmium tetroxide, a peracid such as performic, peracetic, perbenzoic, perphthalic, a permanganate salt such as sodium or potassium permanganate, hydrogen peroxide, the silver acetate-iodine complex or an amine oxide such as N-methyl morpholine oxide in the presence of a metal oxide catalyst such as tungsten oxide, osmium tetroxide, chromic anhydride, and the like. In the preferred embodiment of the invention, osmium tetroxide is used. The proportion of reagent used is usually from one to two moles per mole of steroids, however, smaller or larger proportions are operative for the process of the instant invention. The reaction temperature preferred is between zero and 25 degrees centigrade, but temperatures between minus five and plus fifty degrees centigrade are operative. After the reaction is completed, the product is decomposed through hydrolysis in a basic medium, for example, by aqueous alcoholic solutions containing sodium sulfite, sodium or potassium bicarbonate, or mixtures thereof. The mildly alkaline solution is conveniently added in the presence of a water-miscible organic solvent such as methanol, ethanol, tertiary butyl alcohol, dioxane, or the like, in order to avoid precipitation of the steroid addition product by the water. The decomposition is preferably carried out at room temperature, that is between twenty to thirty degrees centigrade or at temperatures between zero degrees centigrade and room temperature, the lower temperatures being generally preferred. Temperatures above thirty degrees centigrade may easily result in aromatization of the product. The thus produced 10,17β-dihydroxy-4-estren-3-one is recovered from the reaction mixture by conventional procedures such as extraction with water-immiscible organic solvents, such as ether, benzene, toluene, amyl acetate, methylene chloride, dichloroethylene, carbon tetrachloride, or chloroform and the crude product is obtained by evaporating the solvent. The thus obtained crude product is purified by conventional methods such as recrystallization, extraction with suitable solvents or chromatography as deemed necessary.

10-hydroxy-4-estrene-3,17-dione is obtained from 10,17-dihydroxy-4-estren-3-one by oxidation. In the preferred embodiment of the invention 10,17-dihydroxy-4-estren-3-one, dissolved in acetic acid, is reacted with chromium trioxide in the presence of a small amount of water. The oxidation is usually performed at low temperatures, that is between minus ten and plus twenty degrees with temperatures between zero and ten degrees centigrade preferred. Higher temperature produces aromatization of the starting or final material and decreases the yield of the desired 10-hydroxy-4-estrene-3,17-dione. Reaction periods of from one to 48 hours are preferred depending somewhat on the temperature used in the oxidation. The thus obtained product 10-hydroxy-4-estrene-3,17-dione is recovered by conventional methods such as extraction with water-immiscible solvents, for example, methylene dichloride, ethylene dichloride, chloroform, benzene, carbon tetrachloride, ether or the like, evaporation of the solvent, and purification. The purification of the crude product is achieved by recrystallization, extraction or chromatography.

The following examples will serve to illustrate the process and products of this invention, but the said invention is not to be considered as limited thereto.

*Example 1.—10-hydroxy-19-nortestosterone (10,17β-dihydroxy-4-estren-3-one)*

A mixture, containing 0.862 gram of 3-keto-5(10)-estren-17β-ol and one gram of osmium tetroxide in 55 milliliters of benzene, was allowed to stand at room temperature for a period of one half hour. Thereafter four milliliters of pyridine was added and the reaction mixture was cooled to maintain a temperature of about twenty to 25 degrees centigrade for a period of four hours. The reaction mixture was thereafter further cooled and maintained sixteen hours at a temperature of five degrees centigrade in a refrigerator. A solution containing two grams of sodium sulfite and two grams of potassium bicarbonate in thirty milliliters of water, was added to the reaction mixture together with twenty milliliters of methanol and the resulting suspension was stirred for a period of twenty hours at room temperature. The reaction mixture was thereupon filtered and the filtrate layers were separated. The filter cake was washed with fifty-milliliter portions of methanol, and the washings were added to the benzene layer. The combined solutions, benzene layer and methanol washings, were then washed with water, dried over anhydrous sodium sulfate, and concentrated to yield 0.62 gram of crude 10-hydroxy-19-normethyltestosterone.

*Example 2.—10-hydroxy-19-normethyltestosterone*

A solution of 0.5 gram of 3-keto-5(10)-estren-17β-ol in fifty milliliters of benzene was prepared. To this solution was added a solution of 200 milligrams of perbenzoic acid, dissolved in ten milliliters of benzene. After the addition was completed the mixture was allowed to stand in a refrigerator at five degrees overnight. The reaction mixture was thereupon shaken repeatedly with a five percent sodium bicarbonate solution and the sodium bicarbonate aqueous layer was discarded. The benzene layer was thereupon washed repeatedly with water, dried over anhydrous sodium sulfate, and evaporated to dryness to give 5(10)-oxido-3-ketoestran-17β-ol.

The thus obtained crude 5(10)-oxido-3-ketoestran-17β-ol was dissolved in fifty milliliters of methanol and thereto was added one-half gram of potassium hydroxide dissolved in five milliters of water. The mixture is thereupon heated to reflux on the water bath for a period of fifteen minutes, cooled to room temperature, neutralized by the addition of hydrochloric acid, and the thus-obtained neutralized mixture poured into 250 milliliters of ice water. The thus produced precipitate was collected on a filter, washed repeatedly with water and recrystallized from acetone Skellysolve B hexane solution to give pure 10,17β-dihydroxy-4-estren-3-one.

In a manner similar to Example 2, 10,17-dihydroxy-4-estren-3-one may be prepared by epoxidation of 3-keto-5(10)-estren-17β-ol with other peracids such as performic, peracetic, perpropionic, perphthalic, and subsequent opening and dehydration of the epoxy compound.

The hydroxylation of 3-keto-5(10)-estren-17β-ol to give 10,17β-dihydroxy-4-estren-3-one may also be performed with potassium permanganate, hydrogen peroxide, or amine oxides such as N-methyl morpholine oxide, especially when metal oxide catalyst, for example, tungsten oxide, osmium tetroxide, chromic anhydride, etc., are present.

*Example 3.—10-hydroxy-4-estrene-3,17-dione*

A solution containing 58 milligrams of chromium trioxide, 1.5 milliliters of acetic acid and 0.16 milliliter of water was prepared. A solution containing 58 milligrams of 10,17β-dihydroxy-4-estren-3-one, dissolved in 1.8 milliliters of acetic acid was added to the oxidant solution and the reaction mixture was cooled to five degrees centigrade for a period of 16 hours. Thereafter two milliliters of methanol was added and after two hours the solution was diluted with fifteen milliliters of water and extracted with methylene dichloride. The extracts were washed with aqueous sodium bicarbonate, water, dried over anhydrous sodium sulfate and, after filtering, concentrated to give 64.1 milligrams of an oil. The thus obtained oil was chromatographed over eight grams of Florisil anhydrous magnesium silicate taking the following fifty-milliliter fractions:

TABLE I

| Fraction | Solvent |
|---|---|
| 1 | Acetone-Skellysolve B hexanes 5:95. |
| 2 | Acetone-Skellysolve B hexanes 5:95. |
| 3 | Acetone-Skellysolve B hexanes 5:95. |
| 4 | Acetone-Skellysolve B hexanes 10:90. |
| 5 | Acetone-Skellysolve B hexanes 10:90. |
| 6 | Acetone-Skellysolve B hexanes 10:90. |
| 7 | Acetone-Skellysolve B hexanes 10:90. |
| 8 | Acetone-Skellysolve B hexanes 10:90. |
| 9 | Acetone-Skellysolve B hexanes 10:90. |
| 10 | Acetone-Skellysolve B hexanes 10:90. |
| 11 | Acetone-Skellysolve B hexanes 10:90. |
| 12 | Acetone-Skellysolve B hexanes 20:80. |
| 13 | Acetone-Skellysolve B hexanes 20:80. |

Fractions 4 and 5 were combined to give seventeen milligrams of 10-hydroxy-4-estrene-3,17-dione which after recrystallization from ether was found to have a melting point of 198 to 201 degrees centigrade; λ alc./max. 235.5 Mμ, ε=14,025.

*Analysis.*—Calcd. for $C_{18}H_{24}O_3$: C, 74.97; H, 8.39. Found: C, 75.29; H, 8.62.

*Example 4.—Estradiol from 10,17β-dihydroxy-4-estren-3-one*

A mixture of 100 milligrams of 10,17β-dihydroxy-4-estren-3-one, five milliliters of acetic acid and one drop of sulfuric acid was heated on a steam bath for a period of one half hour. The mixture was thereupon poured into fifty milliliters of ice water and the precipitate collected on a filter. Recrystallization of the precipitate from acetone and Skellysolve B hexane produced pure estradiol.

*Example 5.—Estrone from 10-hydroxy-4-estrene-3,17-dione*

In the manner shown in Example 4, heating 10-hydroxy-4-estrene-3,17-dione, dissolved in glacial acetic acid, in the presence of sulfuric acid on a steam bath for a period of thirty minutes produced estrone, recoverable from the reaction mixture as shown in Example 4.

It is to be understood that the invention is not to be limited to the exact details of the procedure shown and described as obvious modifications and equivalents will be apparent to one skilled in the art and the invention is therefore to be limited only by the scope of the appended claims.

1. A process which comprises: treating 17β-hydroxy-5(10)-estren-3-one with osmium tetroxide and hydrolyzing and dehydrating the thus prepared osmate with an alkali reagent to obtain 10,17β-dihydroxy-4-estren-3-one.

2. A process which comprises: treating 17β-hydroxy-5(10)-estren-3-one with osmium tetroxide at a temperature between minus five and plus fifty degrees centigrade and hydrolyzing and dehydrating the thus prepared osmate ester with a sodium sulfite solution at a temperature between zero and thirty degrees centigrade to give 10,17-dihydroxy-4-estren-3-one.

3. A process which comprises: treating 17β-hydroxy-5(10)-estren-3-one with osmium tetroxide, hydrolyzing and dehydrating the thus prepared osmate with an alkali reagent to obtain 10,17β-dihydroxy-4-estren-3-one and oxidizing the thus produced 10,17β-dihydroxy-4-estren-3-one with chromic anhydride to yield 10-hydroxy-4-estrene-3,17-dione.

4. A process which comprises: treating 17β-hydroxy-5(10)-estren-3-one with osmium tetroxide at a temperature between zero and fifty degrees centigrade, hydrolyzing and dehydrating the thus prepared osmate ester with a sodium sulfite solution at a temperature between zero and thirty degrees centigrade to give 10,17β-dihydroxy-4-estren-3-one and oxidizing the thus produced 10,17β-dihydroxy-4-estren-3-one with chromic anhydride to yield 10-hydroxy-4-estrene-3,17-dione.

References Cited in the file of this patent

UNITED STATES PATENTS 2,729,654　　Colton _____ Jan. 3, 1956